United States Patent
Schleinkofer et al.

(10) Patent No.: US 6,942,433 B2
(45) Date of Patent: Sep. 13, 2005

(54) MILLING TOOL

(75) Inventors: Uwe Schleinkofer, Reutte (AT); Jürgen Duwe, Heiterwang (AT); Wolfgang Koch, Reutte (AT); Didier Le Borgne, Bouaye (FR)

(73) Assignees: Ceratizit Austria Gesellschaft, Reutte (AT); Airbus France, Societe par Actions Simplifiee, Toulouse (FR)

( * ) Notice: Subject to any disclaimer, the term of this patent is extended or adjusted under 35 U.S.C. 154(b) by 0 days.

(21) Appl. No.: 10/873,435

(22) Filed: Jun. 21, 2004

(65) Prior Publication Data

US 2004/0253062 A1 Dec. 16, 2004

Related U.S. Application Data

(63) Continuation of application No. PCT/AT02/00348, filed on Dec. 13, 2002.

(30) Foreign Application Priority Data

Dec. 21, 2001 (AT) .................................. GM972/2001

(51) Int. Cl.$^7$ ................................................ B23C 5/20
(52) U.S. Cl. ........................... 407/42; 407/53; 407/54; 407/113
(58) Field of Search ........................ 407/113, 42, 46, 407/47, 53, 54, 114, 60, 61, 66

(56) References Cited

U.S. PATENT DOCUMENTS

| | | |
|---|---|---|
| 4,940,369 A | 7/1990 | Aebi et al. |
| 5,382,118 A | 1/1995 | Satran et al. |
| 5,437,522 A | 8/1995 | Satran et al. |
| 5,810,519 A | 9/1998 | Vogel et al. |
| 5,957,633 A * | 9/1999 | Hall ............................ 408/187 |
| 6,048,140 A | 4/2000 | Johnson |
| 6,053,673 A * | 4/2000 | Swift et al. .................... 407/42 |
| 6,135,681 A * | 10/2000 | Nuzzi et al. ................. 408/227 |
| 6,503,028 B1 * | 1/2003 | Wallstrom .................... 407/35 |
| 6,692,197 B2 * | 2/2004 | Villa ............................ 407/35 |

FOREIGN PATENT DOCUMENTS

| | | |
|---|---|---|
| EP | 0 239 045 B1 | 9/1987 |
| EP | 0 489 702 B1 | 6/1992 |
| EP | 0 585 800 B1 | 3/1994 |
| EP | 0 587 109 B1 | 3/1994 |
| EP | 0 699 495 A1 | 3/1996 |
| EP | 1 075 889 A1 | 2/2001 |
| JP | 2000141123 A | 5/2000 |
| JP | 2000308908 A | 11/2000 |

* cited by examiner

Primary Examiner—Willmon Fridie, Jr.
(74) Attorney, Agent, or Firm—Laurence A. Greenberg; Werner H. Stemer; Ralph E. Locher

(57) ABSTRACT

A milling tool has a cutting edge geometry with a main cutting edge, a cutting corner, optionally with a bordering planar cutting edge segment, and a secondary cutting edge. The tool is used for milling to achieve the smoothest level surface possible parallel to the rotational axis of the milling tool. Each main cutting edge is formed to result in a generatrix of the envelope curve described by the rotation of the milling tool that has a first outwardly curving segment and a second inwardly curving segment. The first segment increases in its distance from the rotational axis from the beginning of the segment to the end of the segment. The distance of the second segment decreases from its beginning towards its end. The tangents at each point of the second segment encompass an angle $\alpha_2$ of more than 0° and up to 3° with a parallel to the rotational axis.

13 Claims, 5 Drawing Sheets

MILLING TOOL

CROSS-REFERENCE TO RELATED APPLICATION

This application is a continuation, under 35 U.S.C. § 120, of copending international application No. PCT/AT02/00348, filed Dec. 13, 2002, which designated the United States; this application also claims the priority, under 35 U.S.C. § 119, of Austrian patent application No. GM 972/2001, filed Dec. 21, 2001; the prior applications are herewith incorporated by reference in their entirety.

BACKGROUND OF THE INVENTION

Field of the Invention

The invention relates to a milling tool with one or more cutting segments, each with a cutting edge geometry consisting of a main cutting edge, a cutting corner—optionally designed with a bordering planar cutting edge segment—and a secondary edge. The milling tool is to be used for machining of smooth workpiece surfaces positioned on a plane parallel to the rotational axis of the milling tool.

Milling tools of this kind are used in machining operations to undercut large recesses in processed parts. In the process, the milling tool machines the side wall of the recess with the main cutting edge, while the forward section of the cutting corner (for smaller cutting geometries) or a planar cutting edge bordering the forward section of the cutting corner (for larger cutting geometries) mills the bottom surface of the recess. The optimum cutting depth during the milling process is determined with reference to the total length of the main cutting edge, and the recess is machined in a series of partial cutting operations carried out in a "line by line" sequence.

European patent EP 0 489 702 B1 describes a square reversible cutting insert with completely straight cutting edges also suitable for use in milling tools. Given an axial approach angle of 0° and neglecting the production tolerances for insert seat and reversible cutting insert, a cutting edge geometry of this kind would make it possible to produce a smooth side wall surface precisely parallel to the axis of rotation, as in this case the generatrix of the envelope curve described by the rotation of the milling tool is also straight. An axial approach angle of 0° is virtually impossible in practice, however, due to the simultaneous complete action of the main cutting edge, meaning that the reversible cutting insert must be inclined at a certain axial approach angle which ordinarily ranges between 1 and 15 degrees. Due to this inclination, the generatrix of the envelope curve is no longer straight but describes a compound curve which produces a wave-shaped surface, the troughs of which are ordinarily rather deep, measuring up to several hundredths of a millimeter. Moreover, the peaks of the waves are steeply sloped and therefore tend to have sharp edges. The resulting surface thus exhibits a noticeably grooved texture to which subsequently applied paint adheres only poorly and may easily flake off.

European patent EP 0 587 109 B1 and its counterpart U.S. Pat. No. 5,382,118 to Satran et al. describe a basically square reversible cutting insert for milling operations in which each cutting edge comprises three successive different segments. Two successive segments proceeding from the cutting corner serve as a main cutting edge which mills the side wall of the recess in the workpiece. The two sections are designed in such a way that, when the reversible cutting insert is in the installed position, i.e. with reference to the axial and radial approach angle of the basic tool body, all points theoretically lie along a precisely cylindrical envelope curve. In other words, the generatrix that produces the envelope curve also forms an exactly straight line. The third section of each cutting edge is designed in such a way that it is not involved in the machining of the side wall and serves as a planar edge for the following main cutting edge in the milling of the floor of the machined recess.

Theoretically, precisely cylindrical envelope curves can also be produced with a milling tool in accordance with European patent EP 0 239 045 B1 and its counterpart U.S. Pat. No. 4,490,369 to Aebi et al. The only difference between that invention and that described in the preceding patent publications is that the reversible cutting insert is shaped as an elongated parallelogram of which only the two long cutting edges can be used as main cutting edges, although they are then applied to a surface area of greater length.

With a cutting insert design of the latter two disclosures it is theoretically possible to achieve a smooth surface that is precisely parallel to the axis of rotation without producing undesirable transitions. Due to dimensional deviations in the cutting insert and the insert seats of the basic tool body as well as tool drift during the machining process, it happens that during actual operations in practice either the beginning or ending areas of the main cutting edges engaged in milling the side wall no longer lie at the theoretically predetermined positions and thus an exact cylindrical envelope curve is not achieved. This results in a stepped profile in the machined surface with extremely sharp, pointed transitions. In many cases, such surfaces no longer meet the requirements specified by the customer.

SUMMARY OF THE INVENTION

It is accordingly an object of the invention to provide a milling tool, which overcomes the above-mentioned disadvantages of the heretofore-known devices and methods of this general type and which provides for a milling tool with a cutting edge geometry in which the machined workpiece surface conforming to the rotational axis of the milling tool has significantly lower surface roughness than those achieved by comparable milling tools used in similar machining operations and is thus significantly smoother.

With the foregoing and other objects in view there is provided, in accordance with the invention, a milling tool for milling workpiece surfaces, the milling tool having a rotational axis and comprising:

one or more cutting segments, each with a cutting edge geometry including a main cutting edge, a cutting corner, and a secondary cutting edge;

the cutting segments being formed such that a generatrix of an envelope curve described by a rotation of the milling tool includes a cutting corner portion, a first segment adjoining the cutting corner portion, and a second segment adjoining the first segment; the first segment having a projection length of at least 1 mm, in a projection thereof onto the axis of rotation, lying nearest to the rotational axis at a beginning point bordering the cutting corner, and lying farthest from the rotational axis at an end point distal from the cutting corner, and wherein a tangent at each point within the first segment encloses an angle $\alpha_1$ in a range of 0° to 5° with a parallel to the rotational axis;

the second segment having a projection length of at least 1.5 mm, in a projection thereof onto the axis of rotation, lying farthest from the rotational axis at a beginning point thereof bordering on the first segment, lying nearest to the axis of rotation at an end thereof, and wherein a tangent at each point of the second segment encloses an angle $\alpha_2$ in a range from >0° to 3° with the parallel to the rotational axis and the angle $\alpha_2$ increases progressively toward the end of the second segment; and the projection length of the second segment being at least 1.5 times greater than the projection length of the first segment.

In other words, the objects of the invention are achieved in that the generatrix of the envelope curve created by the rotation of the milling tool has the following segments which border one another: a cutting corner portion, a first segment and a second segment; in that the first segment of at least 1 mm projection length—in projection toward the rotational axis—is nearest to the rotational axis in the beginning portion bordering the corner edge portion and is farthest from the rotational axis in the ending portion of this segment, whereby the tangents at each point of this segment encompass an angle area of 0° to 5° with the direction of the rotational axis; further in that the second segment of at least 1.5 mm projection length is farthest from the rotational axis at the beginning point of the second segment bordering on the first segment and is nearest to the rotational axis at its opposite end, whereby the tangents at each point on this segment encompass an angle $\alpha_2$ with the direction of the rotational axis in the range of greater than 0° to 3° which increases progressively toward the end; and in that the projection length of the second segment is at least 1.5 times as large as the projection length of the first segment.

Milling is a machining operation performed using a tool revolving around its axis of rotation. In this process, a cut surface is produced in the workpiece conforming to the rotation-symmetrical envelope curve of the milling tool.

The form and position of the cut surface in the workpiece are determined by the generatrix of the milling tool, whereby the generatrix is derived from the sum of all cutting edges or cutting edge segments of the rotating milling tool which are actually in contact with the workpiece. The rotational curve of the generatrix is the envelope curve of the milling tool.

The basic idea underlying the invention is to design the main cutting edge of the tool from the outset in such a way that the corresponding generatrix of the envelope curve of the milling tool does not—even in the case of a theoretically desirable but practically never achievable workpiece cut surface with a contour conforming exactly to the axis of rotation—achieve an ideal, entirely cylindrical envelope curve surface matching the diameter of the milling tool but instead preferably only one of the points forming the real generatrix lies on the theoretical (ideal) generatrix of the ideal cylindrical surface, whereas the remainder of the course of the real generatrix deviates from the course of the theoretical generatrix. It goes without saying that the design of such a milling tool is also in conformity with the claims of the invention when a limited end portion of the first segment of the generatrix is configured in such a way— namely with a straight form—that this end portion would lie on the theoretical generatrix of the ideal cylindrical surface.

Designed in this way, the milling tool makes the first cut with the part of the main cutting edge that corresponds to the first segment of the generatrix. When the milling tool is applied again to cut a depth ap, the portion of the main cutting edge that corresponds to the second segment of the generatrix smoothes the precut workpiece surface.

In order to achieve the smoothest possible workpiece surface, the main cutting edge of the embodied invention must be designed in such a way that the remainder of the course of the (real) generatrix of the envelope curve deviates from the theoretical generatrix of the ideal cylindrical surface but that its distance from it is as small as possible. Such a design should take into account the fact that, due to dimensional deviations in the main cutting edge resulting from production tolerances, an "overcut" of the theoretical envelope curve, i.e. of the generatrix of the ideal cylinder is reliably avoided over the entire course of the real generatrix.

Practical experience has shown that it is best when the maximum distance from the first segment of the generatrix to the theoretical generatrix of the ideal cylindrical surface is between 5 $\mu$m and 15 $\mu$m and the maximum distance from the second segment at the end of the cutting portion of the main cutting edge to the theoretical generatrix of the ideal cylindrical surface is between 5 $\mu$m and 30 $\mu$m.

Although the surface produced by a milling tool configured in conformity with the invention is also wave-shaped, i.e. not absolutely smooth, the wave troughs are significantly flatter than those produced by milling tools with cutting edges corresponding to the prior art. Due to the decreased depth of the troughs, the peaks of the waves are accordingly less sharp. As a result, layers of paint applied to the surface of workpieces machined in this way bond firmly to the surface and do not flake off.

The individual segments of the generatrix in the preferred embodiment of the invention may have the shape of arcs, straight lines or successive sequences of distinct, curved or straight segments.

A segment of the (real) generatrix formed by the cutting corner may be designed with a relatively sharp-edge, as an arc with a small radius or with a broader curve as an arc with a large radius. It may also take the form of a successive sequence of individual curved or straight segments.

The constant transitions between the cutting corner and the first and second segments can be designed as desired, either as straight or curved segments, although sharp-edged transitions are to be avoided.

In order to improve chip removal, the cutting edge geometry on the cutting surface of the milling tool embodying the invention can be configured with a chip proof geometry, particularly when reversible cutting inserts are used.

Optimum quality is achieved in the machined surface when the cutting edge geometry is configured in such a way that the total projection length, i.e. the longitudinal extension of the real generatrix with respect to the rotational axis, formed by the corner edge portion and the first segment of the main cutting edge, equates approximately to tool cutting depth ap specified for the cutting operation.

A further prerequisite for especially high quality surfaces is that the projection length of the first segment lies within a range equivalent to approximately 20–35% of the sum of the projection lengths of the first and second segments.

In actual practice, the value should not fall below 10% for this portion, as otherwise the improvement in surface quality will not be sufficient.

If the milling tool has a planar cutting edge portion bordering the cutting corner that runs at an angle of approximately 90° to the rotational axis of the milling tool, predominantly level, wide-area milling of the floor of the recess to be machined is achieved.

The cutting edge geometry of the milling tool embodied by the invention is particularly effective if the milling tool is fitted with one or more reversible cutting inserts. This significantly reduces the need to resharpen the cutting edge geometry due to wear, contributing to particularly economical use of the milling tool.

An especially advantageous design of the milling tool embodying the invention is achieved when the first and second segments have the shape of an arc, whereby the radius of the curvature of the first segment is within a range equivalent to 8–15 times the total length of the main cutting edge and the radius of the curvature of the second segment is within a range equivalent to 20–40 times the total length of the main cutting edge. Especially fine surface qualities are achieved within these ranges.

It may also be advantageous to position a third segment adjacent to the second segment, whereby the tangents at every point on the third segment comprise an angle $\alpha_3$ of more than 3° with a parallel to the axis of rotation, and whereby the respective size of each angle $\alpha_3$ increases progressively from the beginning to the end of this segment.

Such a design ensures even for large milling depths that the trailing end of the edge geometry does not recut the workpiece, thus eliminating the danger of an impairment of surface quality.

Where reversible cutting inserts are used, it has proven effective when the individual secondary cutting edges and the corresponding cutting corner and the segments of the main cutting edge are parallel to the positioning surface of the reversible cutting insert at least along the greater part of its length and when any cutting edge segments that do not lie on this common plane are beveled from this plane.

It is also advantageous when the clearance segments bordering the individual cutting edges and the cutting corner of the milling tool embodying the invention have two segments positioned one above the other, whereby the segment immediately adjacent to the cutting edges has a smaller clearance angle than the segment below it.

The smaller clearance angle makes it possible to achieve a larger wedge angle and thus ensures additional stabilization of the cutting edges.

Particularly effective machining is achieved when the reversible cutting insert is designed as a parallelogram with long main cutting edges and short secondary cutting edges. Using a milling tool equipped with such reversible cutting inserts it is possible to achieve large cutting depths while maintaining good stability even when working with small milling diameters. Moreover, tools of this kind are well suited for oblique entry during the machining process.

The outstanding advantage offered by a milling tool embodying the present invention is the smoothness of the workpiece surface which is actually achieved along the plane parallel to the rotational axis of the milling tool.

Once more in summary, the invention relates to a milling tool with an cutting edge geometry comprising a main cutting edge, a cutting corner, optionally configured with a bordering planar cutting edge segment and a secondary cutting edge for use in milling to achieve the smoothest level surface possible parallel to the rotational axis of the milling tool(1). In the preferred embodiment of the invention, every main cutting edge is designed in such a way that the generatrix of the envelope curve described by the rotation of the milling tool has a first segment of at least 1 mm equivalent to a projection length based on the rotational axis which borders on the cutting corner. This segment is shaped in such a way that its distance from the rotational axis increases from its smallest value at the beginning of the segment to its largest value at the end of the segment. The tangents at each point of this segment encompass an angle with a value in the range of 0°–5° to a parallel to the rotational axis. The first segment then borders on a second segment which has a projection length of at least 1.5 mm. The second segment is shaped in such a way that its distance from the rotational axis is largest at the beginning of this segment and decreases progressively to its smallest value at the end of this segment. The tangents at each point of this segment encompass an angle $\alpha_2$ of more than 0° and up to 3° with a parallel to the rotational axis. The projection length of the second segment is at least 1.5 times as large as the projection length of the first segment.

Other features which are considered as characteristic for the invention are set forth in the appended claims.

Although the invention is illustrated and described herein as embodied in a milling tool, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
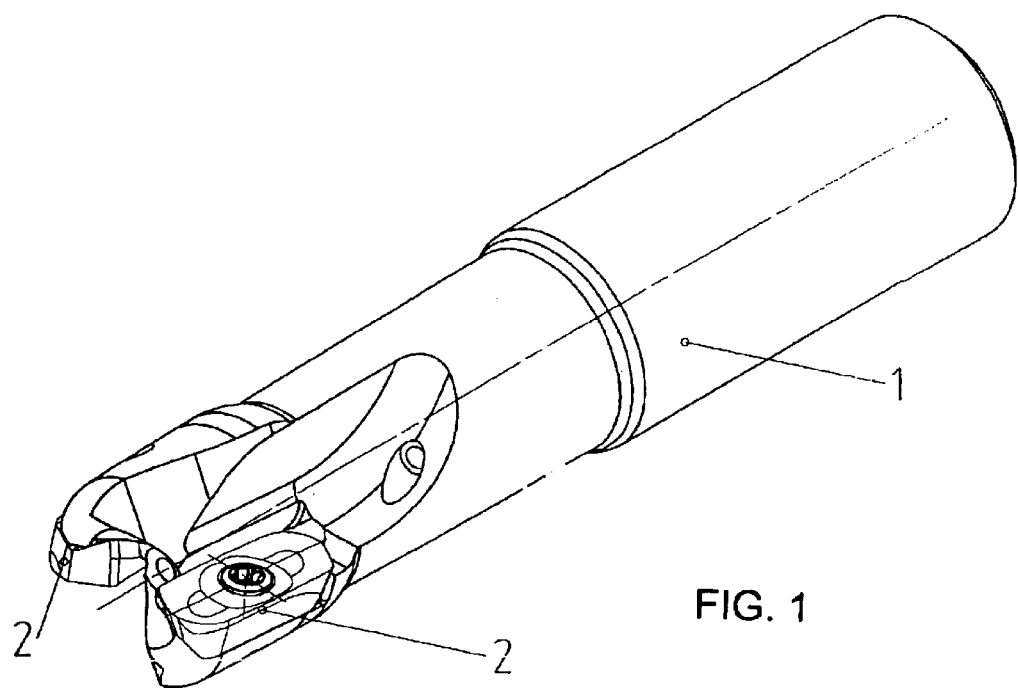
FIG. 1 is a perspective view of a milling tool according to the invention.
Figure 2:
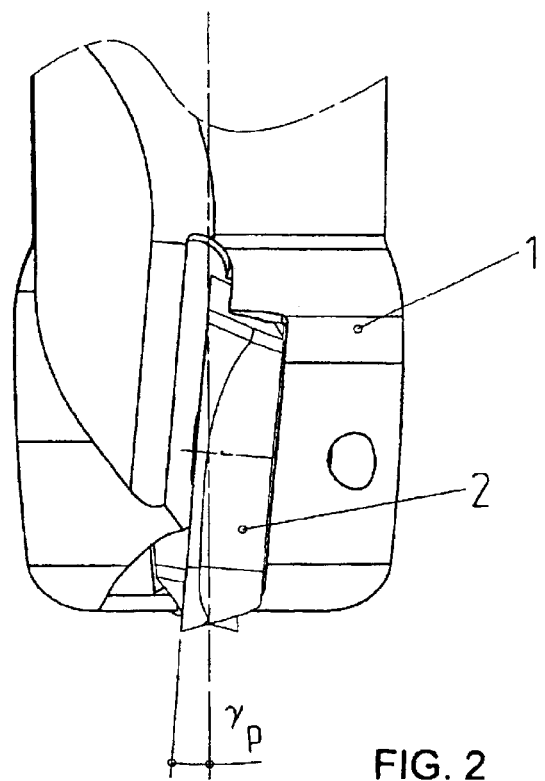
FIG. 2 is a side elevational view of the cutting area of the milling tool embodying the invention as illustrated in FIG. 1.

Referring now to the figures of the drawing in detail and first, particularly, to FIGS. 1 and 2 thereof, there is shown a milling tool 1 embodying the invention. The milling tool 1 is configured for use with reversible cutting inserts as an end mill with two reversible cutting inserts 2. The reversible cutting inserts 2 are positioned at an axial approach angle $\gamma_p$ of 10° in the corresponding insert seat on the milling tool 1.

Figure 3:
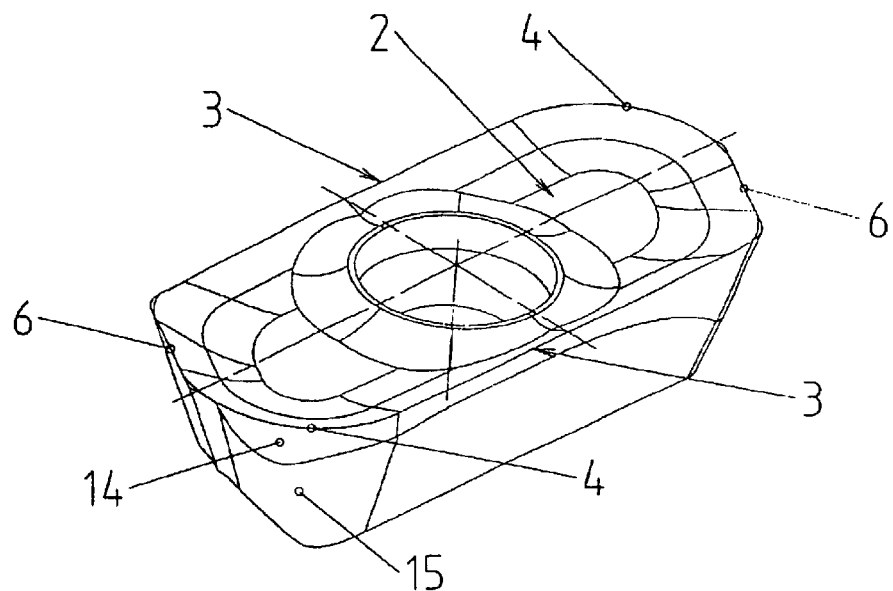
FIG. 3 is an enlarged perspective view of a reversible cutting insert for the milling tool of FIG. 1 and FIG. 2.

The reversible cutting insert 2 as illustrated in FIG. 3 is shaped as a parallelogram with long main cutting edges 3 and short secondary edges 6. The clearance segments bordering on the individual main cutting edges 3 and cutting corners 4 each have two segments 14 and 15 positioned one above the other. The segment 14 immediately adjacent to the main cutting edges 3 and cutting corners 4 has a smaller clearance angle than the segment immediately below it 15. This enlarges the wedge angle of the segment 14 and thus increases the stability of the cutting edges.

Figure 5:
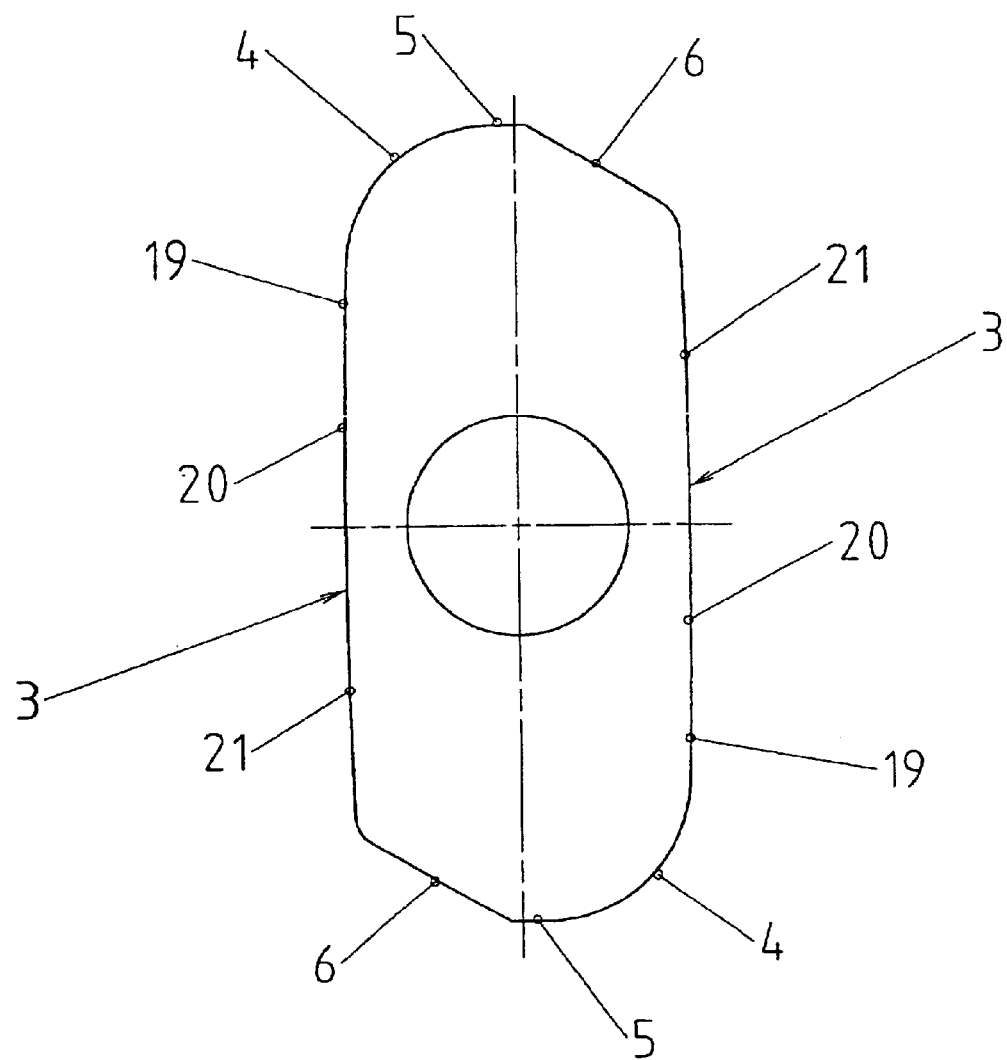
FIG. 5 is a top plan view illustrating the principle of the reversible cutting insert of FIG. 4.

The reversible cutting insert 2 with its different cutting edge segments is illustrated in FIG. 5. The reversible cutting insert has two cutting corners 4 bordered by central planar cutting segments 5. At each opposite end, the cutting corners 4 are bordered by main cutting edges 3, which are in turn bordered by secondary cutting edges 6. Each main cutting edge 3 has distinct cutting edge segments 19, 20, and 21 (cf. FIG. 5).

Figure 4:
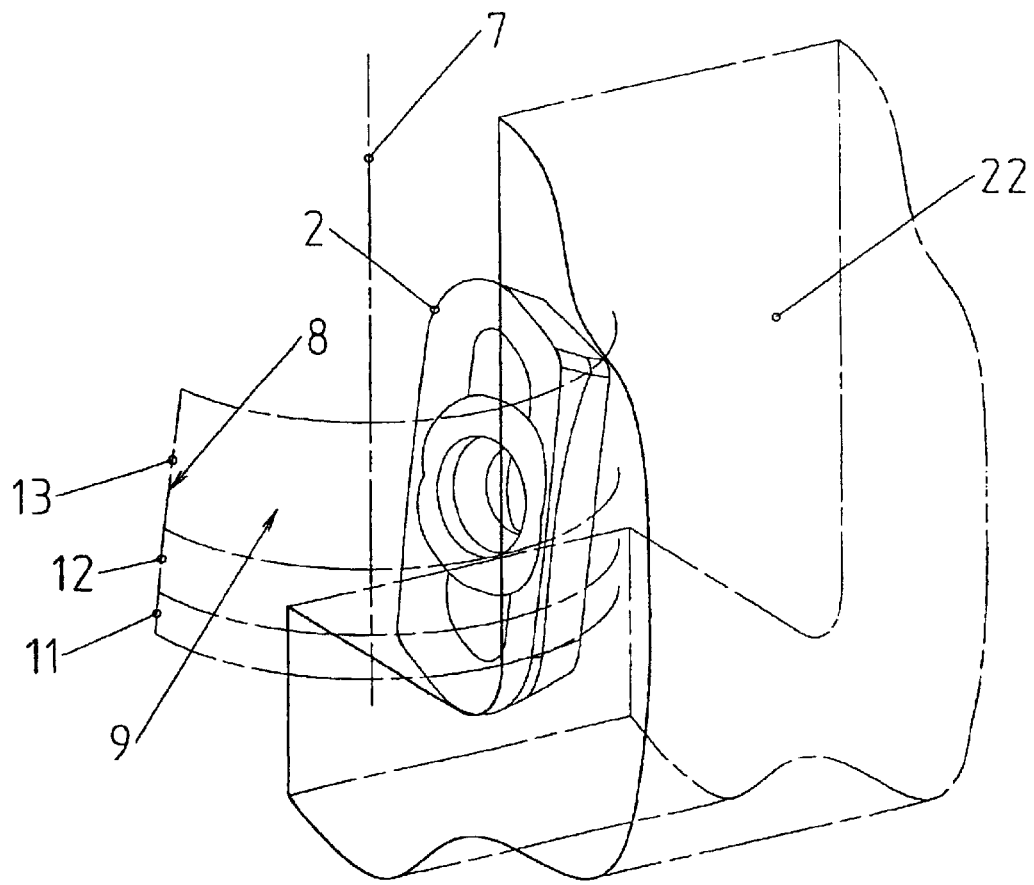
FIG. 4 is a diagrammatic illustration of the principle of the reversible cutting insert for the milling tool of FIG. 1 and FIG. 2 in appropriate installed position, also indicating a workpiece to be machined.

In FIG. 4, the reversible cutting insert 2 installed in the milling tool with an axial approach angle $\gamma_p$ of 10° is shown along with a section of the workpiece 22 to be machined.

Figure 6:
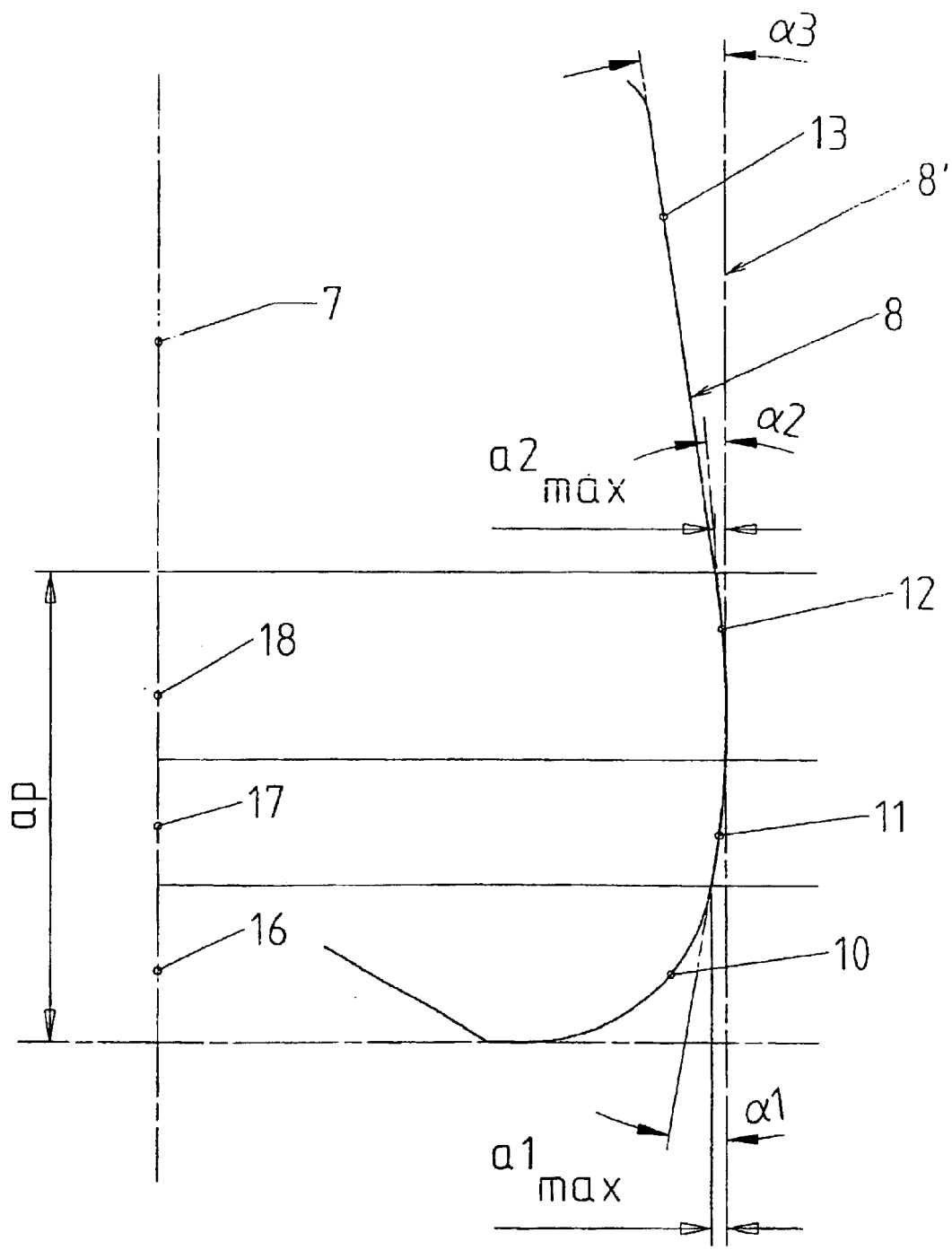
FIG. 6 is an enlarged, strongly exaggerated illustration of the generatrix of the envelope curve described by the rotation of the reversible cutting insert bit as illustrated in FIG. 4.

This illustration also indicates a portion of the envelope curve 9 described by the reversible cutting insert 2 during rotation of the milling tool. The generatrix 8 of the complete envelope curve 9 is shown in exaggerated form in FIG. 6. The generatrix 8 begins with a segment 10 corresponding to the cutting corner 4 of the reversible cutting insert 2. Bordering on this segment 10 is the first segment 11 that corresponds to one segment 19 of the reversible cutting insert 2. This segment 11 is shaped in such a way that its distance from the rotational axis 7 is smallest at the beginning and largest at the end, and its end point also lies on a tangent with the theoretical generatrix 8' of the ideal cylindrical surface. This segment 11 is bordered by a second segment 12, which corresponds to another segment 20 of the reversible cutting insert 2. This segment 12 is shaped in such a way that its distance from the rotational axis 7 is largest at the beginning and smallest at the end of this segment 12. The projection length 18 of this second segment 12 in the direction of the rotational axis 7 is always approximately 1.5 times as long as the projection length 17 of the first segment 11 in the same direction. The projection length of the generatrix 8 of the segment 10 that corresponds to the cutting corner 4 is identified as 16. Optimum workpiece surface quality is achieved when the sum of these projection lengths 16, 17, 18 is approximately equivalent to the cutting depth ap to which the workpiece is to be machined.

The diagrams 7A, 7B, and 7C provide a semi-quantitative statement regarding workpiece surface quality achieved by embodiments of the invention in comparison to the cited state of the art. They illustrate the different workpiece surfaces achieved using two different milling tools embodying the prior art and one milling tool embodying the invention, each shown in an enlarged view demonstrating the principle. In each case, the workpiece surface is represented in a section whereby the rotational axis of the milling tool is in the cutting plane, i.e., in the drawing paper plane.

Figure 7A:
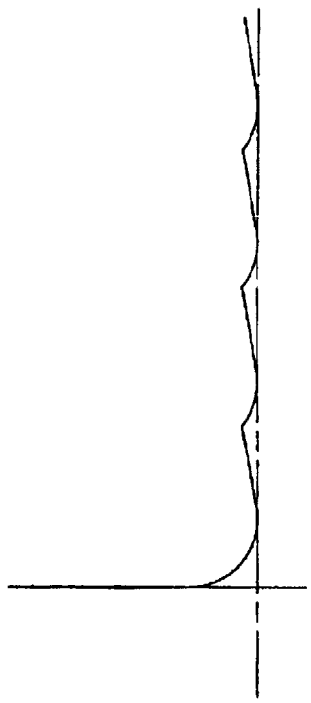
FIG. 7A is an enlarged illustration of the principle of the workpiece surface machined using a milling tool embodying the prior art.

The workpiece surface shown in FIG. 7A corresponds approximately to a surface achieved through milling with a milling tool embodying the prior art as described, for example, in the above-mentioned EP 0 489 702 B1. The wavy surface has wave peaks with uniformly steep-sloping flanks and deep wave troughs. The ridges of the wave peaks are relatively sharp.

Figure 7B:
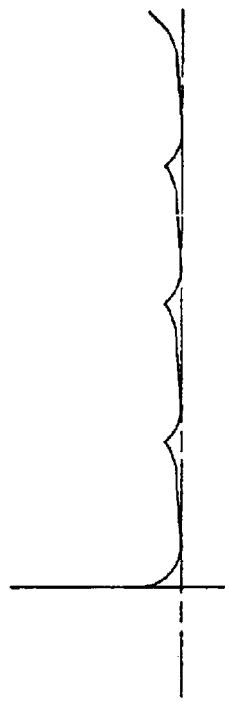
FIG. 7B is an enlarged illustration of the principle of the workpiece surface machined with a different milling tool also embodying the prior art.

The workpiece surface shown in FIG. 7B corresponds approximately to a surface achieved through milling with a milling tool embodying the prior art as described, for example, in the above-mentioned EP 0 587 109 B1 and U.S. Pat. No. 5,382,118. In this case, the wavy surface has wave peaks with flanks which are considerably flatter over much of their course. However, the flanks become significantly steeper as they approach the peak, so that the ridges of the wave peaks are still quite sharp.

Figure 7C:
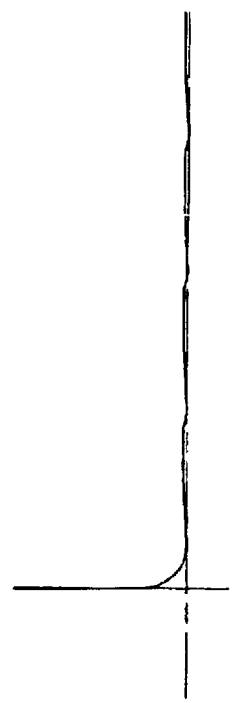
FIG. 7C is an enlarged illustration of the principle of the workpiece surface machined with a milling tool embodying the invention

The surface shown in FIG. 7C, which was achieved through milling with a milling tool embodying the invention, has wave peaks with comparatively very flat slopes without sharp ridges. A surface of this kind is appreciably smoother and is particularly well suited for the application of paint.

We claim:

1. A milling tool for milling workpiece surfaces, the milling tool having a rotational axis and comprising:

one or more cutting segments, each with a cutting edge geometry including a main cutting edge, a cutting corner, and a secondary cutting edge;

said cutting segments being formed such that a generatrix of an envelope curve described by a rotation of the milling tool includes a cutting corner portion, a first segment adjoining said cutting corner portion, and a second segment adjoining said first segment;

said first segment having a projection length of at least 1 mm, in a projection thereof onto the axis of rotation, lying nearest to the rotational axis at a beginning point bordering said cutting corner, and lying farthest from the rotational axis at an end point distal from said cutting corner, and wherein a tangent at each point within said first segment encloses an angle $\alpha_1$ in a range of 0° to 5° with a parallel to the rotational axis;

said second segment having a projection length of at least 1.5 mm, in a projection thereof onto the axis of rotation, lying farthest from the rotational axis at a beginning point thereof bordering on said first segment, lying nearest to the axis of rotation at an end thereof, and wherein a tangent at each point of said second segment encloses an angle $\alpha_2$ in a range from >0° to 3° with the parallel to the rotational axis and the angle $\alpha_2$ increases progressively toward the end of said second segment; and said projection length of said second segment being at least 1.5 times greater than said projection length of said first segment.

2. The milling tool according to claim 1, which further comprises a planar cutting edge segment adjoining said cutting corner.

3. The milling tool according to claim 1, wherein said cutting edge geometry is further configured such that a sum of a projection length of a portion corresponding to said cutting corner and said projection length of said first segment are approximately equivalent to a cutting depth specified for the cutting operation.

4. The milling tool according to claim 1, wherein said projection length of said first segment corresponds to approximately 20% to 35% of a sum of said projection length of said first segment and said projection length of said second segment.

5. The milling tool according to claim 1, wherein said milling tool has a planar cutting edge segment bordering on said cutting corner extending at an angle of approximately 90° relative to the rotational axis of the milling tool.

6. The milling tool according to claim 1, wherein said cutting edge geometry of the milling tool is defined by cutting edges formed on a clamped reversible cutting insert.

7. The milling tool according to claim 1, comprising a shank bit defining the rotatable axis, and at least one reversible cutting insert clamped onto said shank bit, said cutting insert being formed with cutting edges defining said cutting edge geometry of the milling tool.

8. The milling tool according to claim 6, wherein said first segment and said second segment are arc-shaped, wherein a radius of curvature of said first segment lies within a range equivalent to 8–15 times a total length of a main cutting edge, and a radius of a curvature of said second segment lies within a range equivalent to 20–40 times the total length of the main cutting edge.

9. The milling tool according to claim 8, which comprises a third segment adjoining said second segment, wherein a tangent on each point of said third segment encloses an angle $\alpha_3$ of more than 3° with the parallel to the rotational axis, and wherein a value of the angle $\alpha_3$ increases continuously from a beginning to an end of said third segment, more cutting segments, each with a cutting edge geometry including a main cutting edge, a cutting corner, and a secondary cutting edge.

10. The milling tool according to claim 6, wherein said secondary edges, cutting corners and main cutting edges of said reversible cutting insert lie at least in part on a common plane running parallel to a contact surface of said reversible cutting insert, and wherein said cutting edge segments not lying on said common plane are beveled therefrom.

11. The milling tool according to claim 6, which comprises a clearance face bordering said main cutting edges and said cutting corners, said clearance face including two segments positioned one above another, in a side view, and wherein said segment immediately adjacent said cutting edges has a smaller clearance angle than said segment therebelow.

12. The milling tool according to claim 6, wherein said reversible cutting insert has an approximate parallelogram shape, and said shape is defined with long main cutting edges and short secondary cutting edges.

13. In a milling tool according to claim 1, a reversible cutting insert formed with said cutting edges and defining said cutting edge geometry.

\* \* \* \* \*